United States Patent
Konovalov et al.

(10) Patent No.: US 6,454,352 B1
(45) Date of Patent: Sep. 24, 2002

(54) CAR SEAT PAD

(76) Inventors: George Konovalov, 20835 E. Apache Way, Walnut, CA (US) 91789; Jennifer M. Wells, P.O. Box 1466, Brea, CA (US) 92822

( * ) Notice: Subject to any disclaimer, the term of this patent is extended or adjusted under 35 U.S.C. 154(b) by 0 days.

(21) Appl. No.: 09/550,055

(22) Filed: Apr. 14, 2000

(51) Int. Cl.[7] .......................... A47C 31/00; A47D 15/00
(52) U.S. Cl. ............................. 297/219.12; 297/284.3; 297/452.29; 297/452.3; 5/655
(58) Field of Search .................. 297/219.12, 284.9, 297/284.5, 452.3, 452.29; 5/655

(56) References Cited

U.S. PATENT DOCUMENTS

| | | | | |
|---|---|---|---|---|
| 3,540,776 A | * | 11/1970 | Wislon | 297/284.5 |
| 4,441,221 A | * | 4/1984 | Enste et al. | 5/655 X |
| 5,533,787 A | * | 7/1996 | Xiang | 297/284.5 X |
| 5,735,576 A | * | 4/1998 | Pepys et al. | 297/219.12 X |
| 5,826,287 A | * | 10/1998 | Tandrup | 297/219.12 X |
| 5,829,829 A | * | 11/1998 | Clestina-Krevh | 297/219.12 |
| 5,842,739 A | * | 12/1998 | Noble | 297/219.12 |
| 5,916,089 A | * | 6/1999 | Ive | 297/219.12 |

* cited by examiner

*Primary Examiner*—Anthony D. Barfield
(74) *Attorney, Agent, or Firm*—David A. Belasco; Belasco Jacobs & Townsley LLP

(57) ABSTRACT

A car seat pad for use in child safety seats is described. The seat pad is formed of isotonic foam or encapsulated gel material to insulate an infant or small child from the hard surface of the safety seat. The pad includes a back portion and a hingedly joined seat portion. The back portion includes a number of slots designed to accommodate the seat belt webbing of the child safety seat. The seat portion includes a notch to provide space for the buckle of the seat belt. A removable washable cover is provided for the seat pad. The cover includes reinforced openings aligned with the slots in the back portion of the pad. In versions of the seat pad designed for larger children, a lumbar support pas is attached to the lower end of the back portion and an additional seat pad is attached to the upper end of the seat portion. The side edges of the back and seat portions are tapered to eliminate additional padding material from accumulating in the safety seat when the seat pad is fold to fit within the seat.

10 Claims, 4 Drawing Sheets

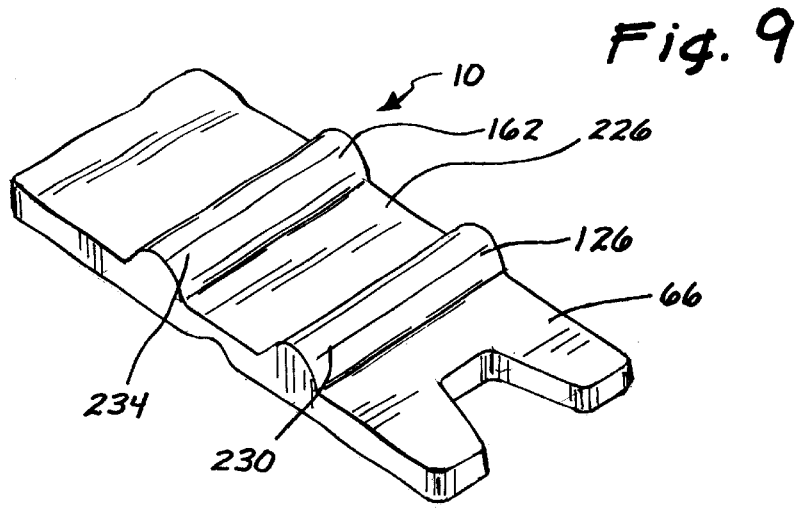
Fig. 9
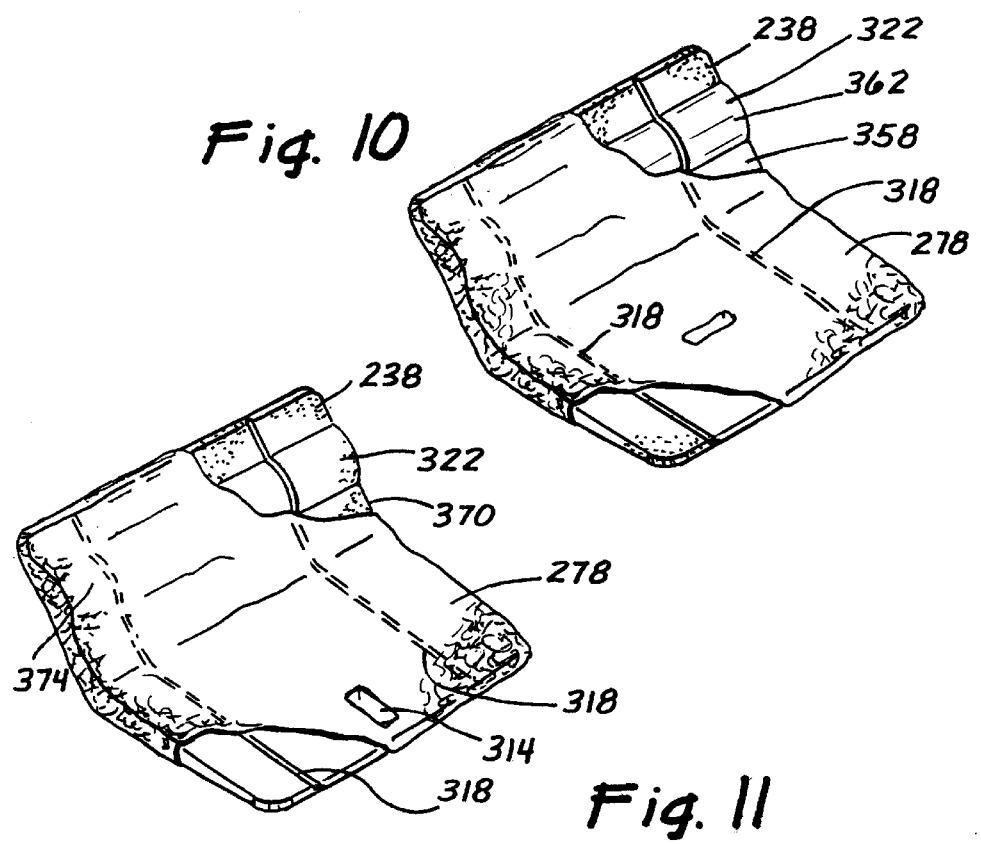
Fig. 10
Fig. 11

CAR SEAT PAD

FIELD OF INVENTION

The invention pertains to padding material for seating structures. More particularly, the invention relates to removable seat padding designed for use with portable child automobile seats.

BACKGROUND OF THE INVENTION

Laws in most states now mandate the use of child safety seats for infants and children under certain weight limits when riding in automobiles. While many designs for child safety seats have been developed, most if not all, provide only rudimentary padding for the developing bones and skeletal structures of infants and small children. As many children spend considerable time in these child safety seats the potential for discomfort, injury and even improper development of bones, muscles and skeletal structures is a very real problem.

Various devices have been developed to provide padding for repeated human contact with hard surfaces. U.S. Pat. No. 5,865,180 issued to Sigfrid discloses a pocket connected to a cover into which is introduced a removable pad and a second pocket designed to close over the pad and the first pocket.

U.S. Pat. No. 5,388,295 issued to Sarkozi, is directed to an adjustable seat and back support pad and mattress that is useful in a car, the pad can be assembled using Velcro, hook-and-loop and can be filled with an elastomer material such as solid or pelletized foam, fiber, cotton gauze, shredded cloth, air, water, gel, etc. This patent discloses an array of resilient, longitudinal, parallel support pads, hingedly attached together, that may be filled with gel. U.S. Pat. No. Re. 34,573, issued to Calvert is directed to a liquid filled bladder for relieving muscle fatigue, pressure sores, blistering, numbness, reduced blood circulation, and tissue damage of an assembly line worker, truck driver, hammer or jackhammer operator, etc. U.S. Pat. No. 4,471,538 issued to Pomeranz et al. is directed to one or more deformable sealed chambers containing a shock absorbing rheopexic fluid for use as shoe inserts, bed tops, horse saddles, bicycle saddles, gloves, or the like.

While other variations exist, the above-described designs for padding systems and structures are typical of those encountered in the prior art. It is an objective of the present invention to provide padding for a child's safety seat that will protect the user from the hard surfaces of the seat. It is a further objective to provide for padding that will conform to the body of the user. It is yet a further objective to provide a seat pad that may be easily secured to a variety of conventional safety seats. It is still a further objective to provide seat pads suitable for both infants and older children. Finally, it is objective of the invention to provide the above-described capabilities in an inexpensive and durable pad that includes a cover that is removable and washable.

While some of the objectives of the present invention are disclosed in the prior art, none of the inventions found include all of the requirements identified.

SUMMARY OF THE INVENTION

The present invention addresses all of the deficiencies of prior art car seat pad inventions and satisfies all of the objectives described above.

A car seat pad providing the desired features may be constructed from the following components. A back portion is provided. The back portion is formed of resilient padding material of a first predetermined thickness. The back portion has a top edge, a bottom edge, a front surface, a rear surface and first and second side edges. The side edges are spaced apart by a first predetermined width. At least one pair of slots is provided. The slots extend from the front surface to the rear surface of the back portion and are sized, shaped and located to accommodate webbing of a child safety seat seatbelt.

A seat portion is provided. The seat portion is formed of resilient padding material of a second predetermined thickness. The seat portion has a top edge, a bottom edge, a front surface, a rear surface and first and second side edges. The side edges are spaced apart by a second predetermined width. The bottom edge includes a notch. The notch is sized, shaped and located to accommodate a buckle of a child safety seat seatbelt. The back portion is hingedly attached at its bottom edge to the top edge of the seat portion.

In a variant of the invention, a removable, washable cover is provided. The cover is sized and shaped to fit slidably over the seat pad. A pair of reversibly separable closure means is provided. The closure means permit removal of the seat pad from the cover. The cover includes reinforced openings. The openings are sized, shaped and located to accommodate passage of webbing of a child safety seat seatbelt through the cover and into the slots in the seat pad.

In another variant, a raised seat support is provided. The seat support is formed of resilient material of a third predetermined thickness and has a top edge, a bottom edge, a first side edge, a second side edge a front surface and a back surface. The seat support is attached at its back surface to the front surface of the seat portion adjacent its top edge.

In yet another variant of the invention, a raised lumbar support is provided. The lumbar support is formed of resilient material of a fourth predetermined thickness and has a top edge, a bottom edge, a first side edge, a second side edge a front surface and a back surface. The lumbar support is attached at its back surface to the front surface of the back portion adjacent its bottom edge.

In still another variant, the first and second side edges of the back portion taper inwardly toward the bottom edge. The bottom edge separates the side edges by a third predetermined width less than the first predetermined width. The first and second side edges of the seat portion taper inwardly toward the top edge. The top edge separates the side edges by the third predetermined width.

When the car seat pad is installed into a child safety seat and folded at an intersection of the back portion and the seat portion, excessive padding material will not accumulate in the safety seat and cause discomfort to a user.

In yet another variant of the invention, the back portion and the seat portion are formed of isotonic foam. In another variant, the seat support is formed of isotonic foam. In still another variant, the lumbar support is formed of isotonic foam.

In a further variant of the invention, the back portion and the seat portion are formed of encapsulated gel material. In still a further variant, the seat support is formed of encapsulated gel material. In yet another variant, the lumbar support is formed of encapsulated gel material.

In still another variant, the car seat pad can be formed of the following components. A back portion is provided that is formed of resilient padding material of a fourth predetermined thickness. The back portion has a top edge, a bottom edge, a front surface, a rear surface and first and second side edges. The side edges are spaced apart by a fourth predetermined width. A seat portion is provided that is formed of resilient padding material of a fifth predetermined thickness. The seat portion has a top edge, a bottom edge, a front surface, a rear surface and first and second side edges. The side edges are spaced apart by a fifth predetermined width. The bottom edge includes a slot sized, shaped and located to accommodate a buckle of a child safety seat seatbelt. The back portion is fixedly attached at its bottom edge to the top edge of the seat portion.

In yet another variant, at least one relief groove is provided. The groove is located on the front surfaces of the back portion and the seat portion and extends from the top edge of the back portion to the bottom edge of the seat portion. When the car seat pad is placed into a molded child safety seat, the relief groove will permit the seat pad to more closely fit the safety seat.

In still another variant of the invention, the seat pad includes a lumbar support. The support is formed of resilient padding material of a sixth predetermined thickness and has a front surface, a back surface, a first end and a second end. The first and second ends are separated by the fourth predetermined width. Means are provided for removably attaching the lumbar support adjacent the front surface of the back portion between the top edge and the bottom edge of the back portion.

In yet a further variant, the back portion and the seat portion are formed of isotonic foam. In still a further variant, the back portion and the seat portion including the relief groove are formed of isotonic foam.

In yet another variant of the invention, the lumbar support is formed of isotonic foam. In still another variant, the back portion and the seat portion are formed of encapsulated gel material. In yet a further variant, the back portion and the seat portion including the relief groove are formed of encapsulated gel material. In a final variant of the invention, the lumbar support is formed of encapsulated gel material.

An appreciation of the other aims and objectives of the present invention and an understanding of it may be achieved by referring to the accompanying drawings and the detailed description of a preferred embodiment.

DESCRIPTION OF THE DRAWINGS

FIG. 9 is a perspective view a second embodiment including an additional seat support and a lumbar support formed of encapsulated gel material;

FIG. 10 is a perspective view the FIG. 5 embodiment formed of isotonic foam material; and FIG. 11 is a perspective view the FIG. 5 embodiment formed encapsulated gel material.

DETAILED DESCRIPTION OF THE PREFERRED EMBODIMENT

Figure 1:
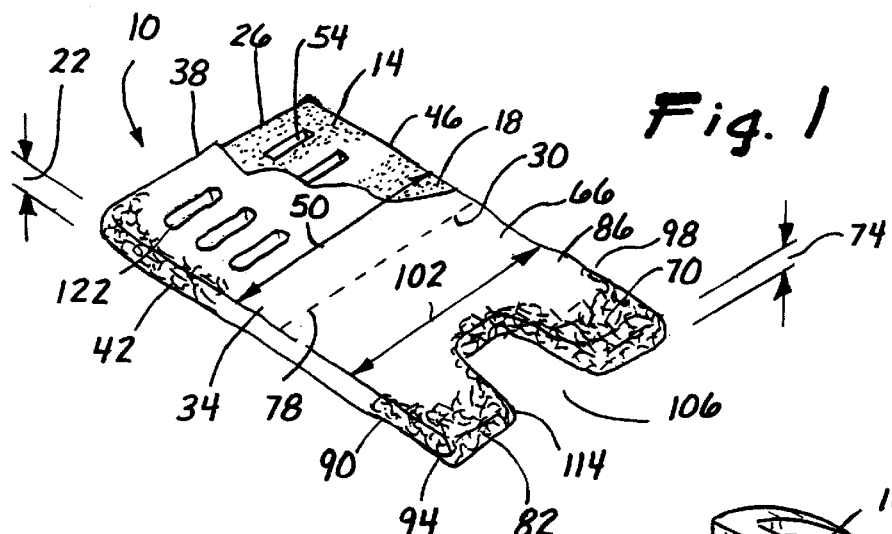
FIG. 1 is a perspective view of the preferred embodiment of the invention including seatbelt slots and washable cover.
Figure 2:
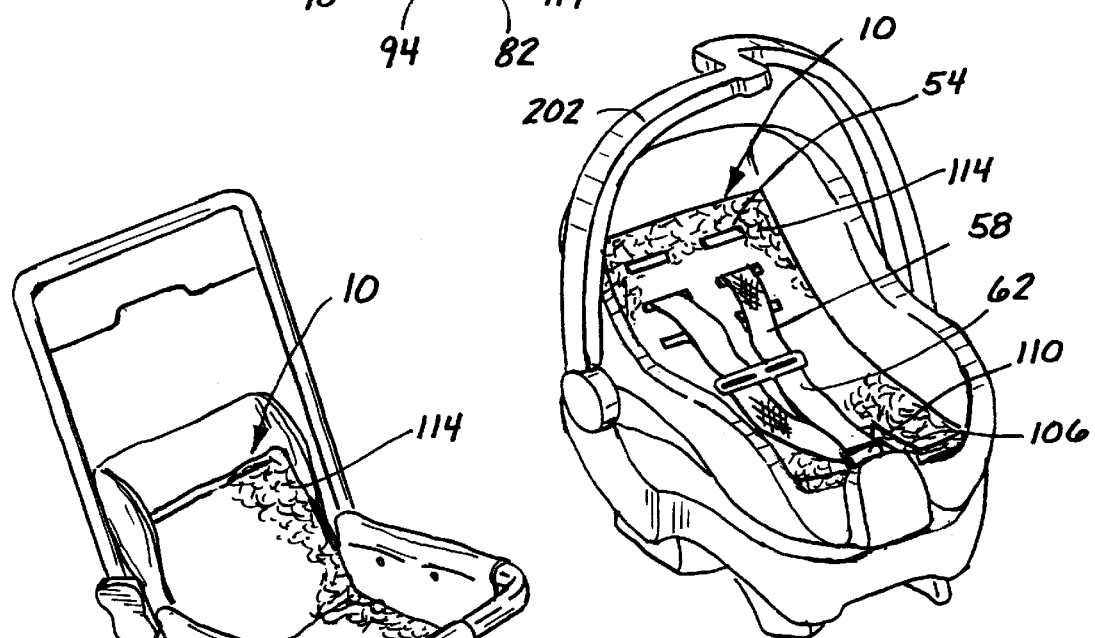
FIG. 2 is a perspective view of the FIG. 1 embodiment installed in a car seat baby carrier.
Figure 3:
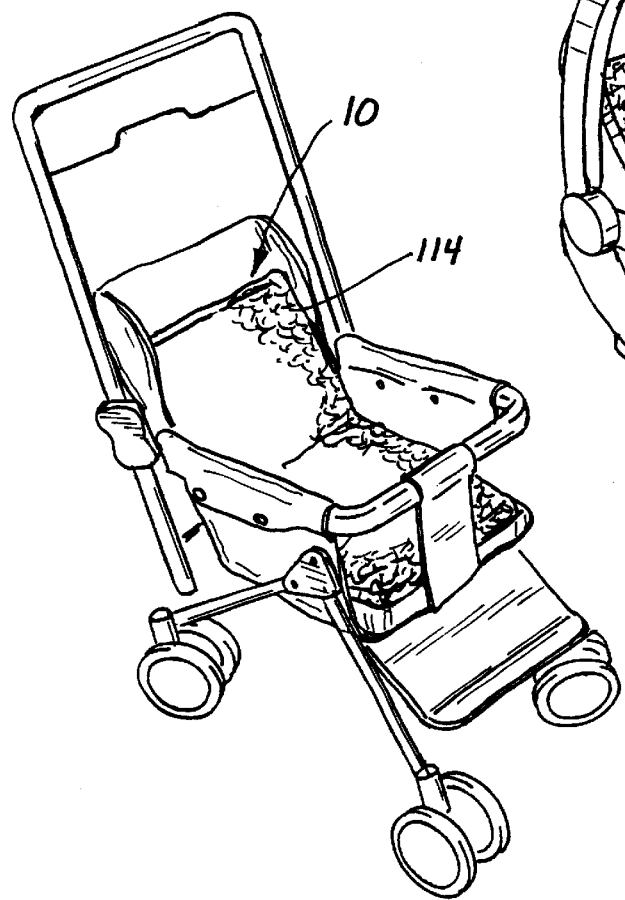
FIG. 3 is a perspective view of the FIG. 1 embodiment installed in a stroller.

FIGS. 1–11 illustrate a car seat pad 10 of the present invention. As illustrated in FIGS. 1–3, a back portion 14 is provided. The back portion 14 is formed of resilient padding material 18 of a first predetermined thickness 22. The back portion 14 has a top edge 26, a bottom edge 30, a front surface 34, a rear surface 38 and first 42 and second 46 side edges. The side edges 42, 46 are spaced apart by a first predetermined width 50. At least one pair of slots 54 is provided. The slots 54 extend from the front surface 34 to the rear surface 38 of the back portion 14 and are sized, shaped and located to accommodate webbing 58 of a child safety seat seatbelt 62.

A seat portion 66 is provided. The seat portion 66 is formed of resilient padding material 70 of a second predetermined thickness 74. The seat portion 66 has a top edge 78, a bottom edge 82, a front surface 86, a rear surface 90 and first 94 and second 98 side edges. The side edges 94, 98 are spaced apart by a second predetermined width 102. The bottom edge 82 includes a notch 106. The notch 106 is sized, shaped and located to accommodate a buckle 110 of a child safety seat seatbelt 62. The back portion 14 is hingedly attached at its bottom edge 30 to the top edge 78 of the seat portion 66.

In a variant of the invention, a removable, washable cover 114 is provided, the cover 114 is sized and shaped to fit slidably over the seat pad 10. A pair of reversibly separable closure means (not shown) is provided. The closure means 118 permit removal of the seat pad 10 from the cover 114. The cover 114 includes reinforced openings 122. The openings 122 are sized, shaped and located to accommodate passage of webbing 58 of a child safety seat seatbelt 62 through the cover 114 and into the slots 54 in the seat pad 10.

Figure 4:
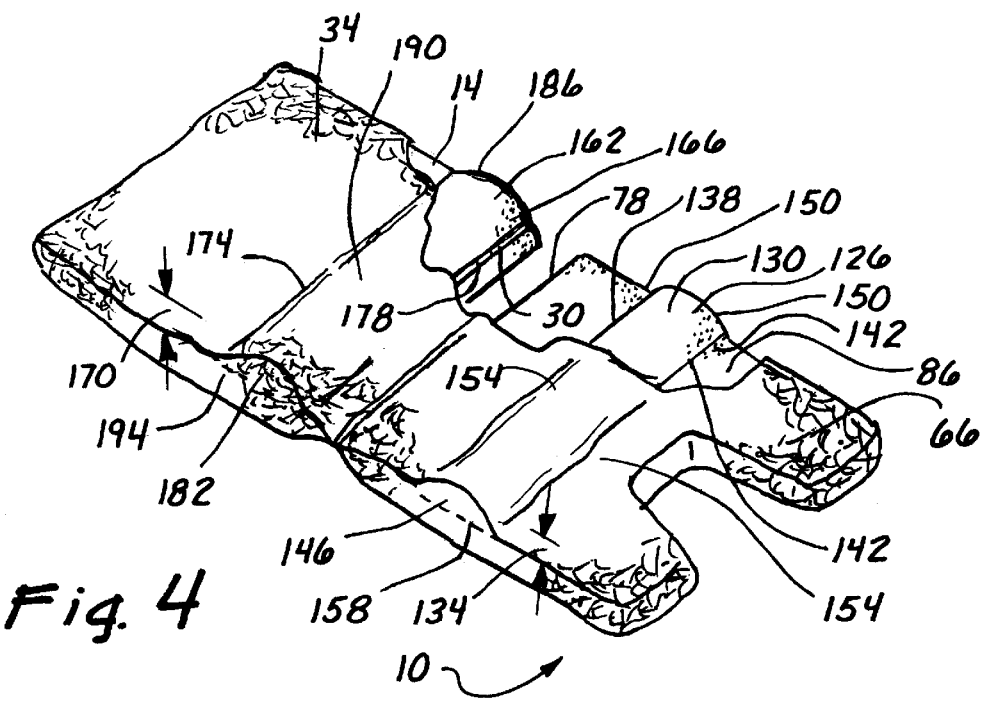
FIG. 4 is a perspective view a second embodiment including an additional seat support and a lumbar support.

In another variant, as illustrated in FIG. 4, a raised seat support 126 is provided. The seat support 126 is formed of resilient material 130 of a third predetermined thickness 134 and has a top edge 138, a bottom edge 142, a first side edge 146, a second side edge 150 a front surface 154 and a back surface 158. The seat support 126 is attached at its back surface 158 to the front surface 86 of the seat portion 66 adjacent its top edge 78.

In yet another variant of the invention, also illustrated in FIG. 4, a raised lumbar support 162 is provided. The lumbar support 162 is formed of resilient material 166 of a fourth predetermined thickness 170 and has a top edge 174, a bottom edge 178, a first side edge 182, a second side edge 186, a front surface 190 and a back surface 194. The lumbar support 162 is attached at its back surface 194 to the front surface 34 of the back portion 14 adjacent its bottom edge 30.

Figure 7:
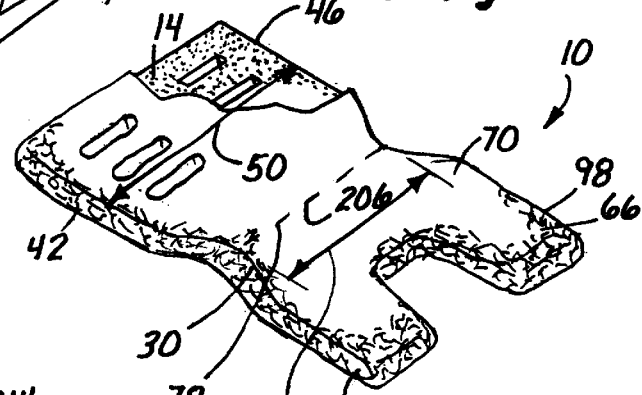
FIG. 7 is a perspective view of a fourth embodiment including tapering sides for the back and seat portions.

In still another variant, as illustrated in FIG. 7, the first 42 and second 46 side edges of the back portion 14 taper inwardly toward the bottom edge 30. The bottom edge 30 separates the side edges 42, 46 by a third predetermined width 198 less than the first predetermined width 50. The first 94 and second 98 side edges of the seat portion 66 taper inwardly toward the top edge 78. The top edge 78 separates the side edges 94, 98 by the third predetermined width 198.

When the car seat pad 10 is installed into a child safety seat 202 and folded at an intersection 206 of the back portion 14 and the seat portion 66, excessive padding material 18,70 will not accumulate in the safety seat 202 and cause discomfort to a user 210.

Figure 8:
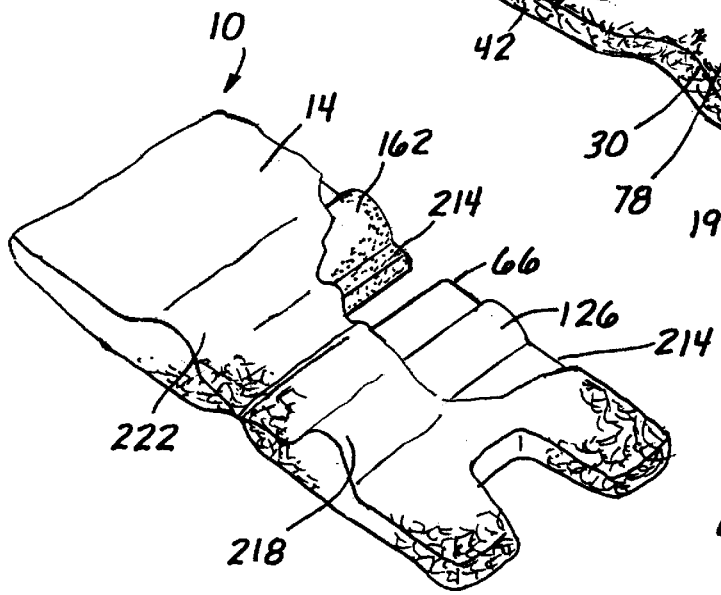
FIG. 8 is a perspective view a second embodiment including an additional seat support and a lumbar support formed of isotonic foam material.

In yet another variant of the invention, as illustrated in FIG. 8, the back portion 14 and the seat portion 66 are formed of isotonic foam 214. In another variant, the seat support 126 is formed of isotonic foam 218. In still another variant, the lumbar support 162 is formed of isotonic foam 222.

In a further variant of the invention, as illustrated in FIG. 9, the back portion 14 and the seat portion 66 are formed of encapsulated gel material 226. In still a further variant, the seat support 126 is formed of encapsulated gel material 230. In yet another variant, the lumbar support 162 is formed of encapsulated gel material 234.

Figure 5:
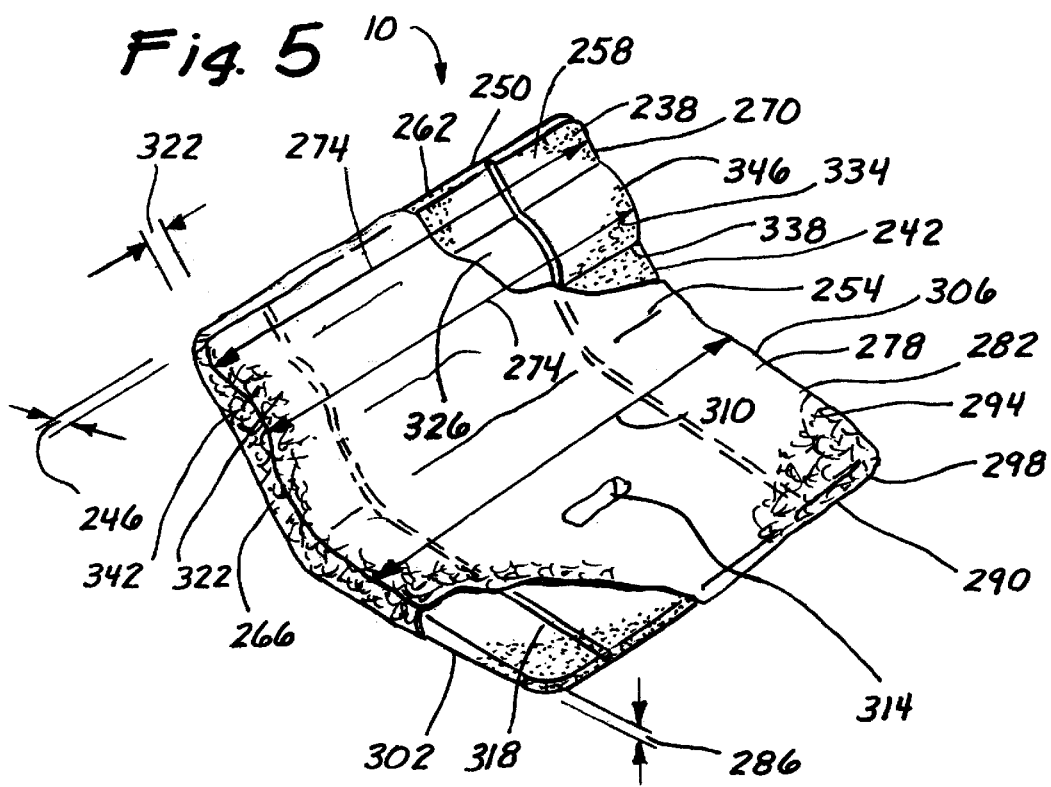
FIG. 5 is a perspective view of a third embodiment including relief grooves.
Figure 6:
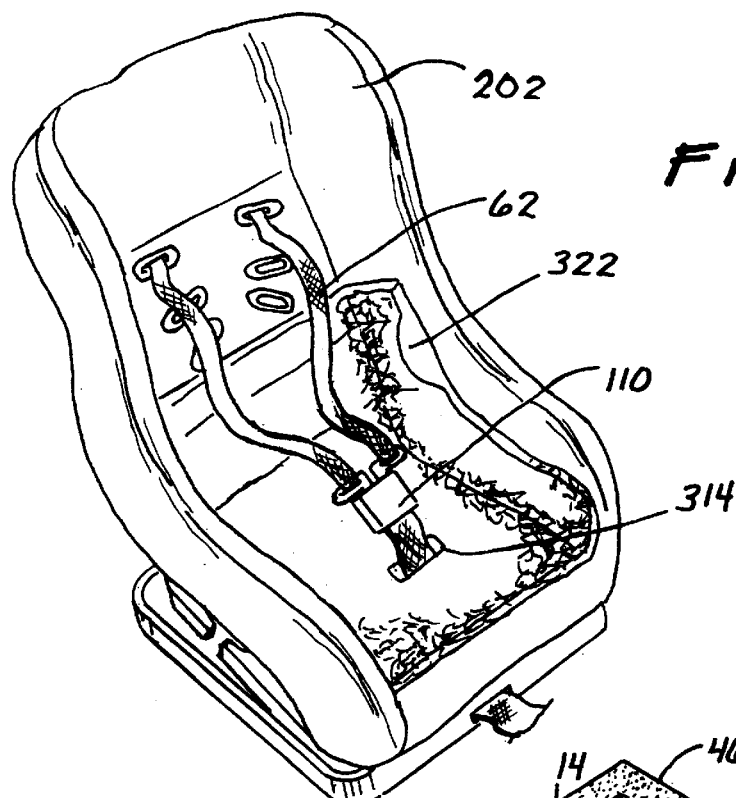
FIG. 6 is a perspective view of the FIG. 5 embodiment installed in a car seat baby carrier.

In still another variant, as illustrated in FIG. 5, the car seat pad 10 can be formed of the following components. A back portion 238 is provided that is formed of resilient padding material 242 of a fourth predetermined thickness 246. The back portion 238 has a top edge 250, a bottom edge 254, a front surface 258, a rear surface 262 and first 266 and second 270 side edges. The side edges 266, 270 are spaced apart by a fourth predetermined width 274. A seat portion 278 is provided that is formed of resilient padding material 282 of a fifth predetermined thickness 286. The seat portion 278 has a top edge 286, a bottom edge 290, a front surface 294, a rear surface 298 and first 302 and second 306 side edges. The side edges 302, 306 are spaced apart by a fifth predetermined width 310. The bottom edge 290 includes a slot 314 sized, shaped and located to accommodate a buckle 110 of a child safety seat seatbelt 62. The back portion 238 is fixedly attached at its bottom edge 254 to the top edge 286 of the seat portion 278.

In yet another variant, also illustrated in FIG. 5, at least one relief groove 318 is provided. The groove 318 is located on the front surfaces 258, 294 of the back portion 238 and the seat portion 278 and extends from the top edge 250 of the back portion 238 to the bottom edge 290 of the seat portion 278. When the car seat pad 10 is placed into a molded child safety seat 202, the relief groove 318 will permit the seat pad 10 to more closely fit the safety seat 202.

In still another variant of the invention, also illustrated in FIG. 5, the seat pad 10 includes a lumbar support 322. The support 322 is formed of resilient padding material 326 of a sixth predetermined thickness 330 and has a front surface 334, a back surface 338, a first end 342 and a second end 346. The first 342 and second 346 ends are separated by the fourth predetermined width 274. Means 350 are provided for removably attaching the lumbar support 322 adjacent the front surface 258 of the back portion 238 between the top edge 250 and the bottom edge 254 of the back portion 238.

In yet a further variant, illustrated in FIG. 10, the back portion 238 and the seat portion 278 are formed of isotonic foam 354. In still a further variant, the back portion 238 and the seat portion 278 including the relief groove 318 are formed of isotonic foam 358.

In yet another variant of the invention, also illustrated in FIG. 10, the lumbar support 322 is formed of isotonic foam 362. In still another variant, illustrated in FIG. 11, the back portion 238 and the seat portion 278 are formed of encapsulated gel material 366. In yet a further variant, the back portion 238 and the seat portion 278 including the relief groove 318 are formed of encapsulated gel material 370. In a final variant of the invention, also illustrated in FIG. 11, the lumbar support 322 is formed of encapsulated gel material 374.

The car seat pad 10 has been described with reference to particular embodiments. Other modifications and enhancements can be made without departing from the spirit and scope of the claims that follow.

What is claimed is:

1. A car seat pad, comprising:

a back portion, said back portion being formed of resilient padding material of a first predetermined thickness, and having a top edge, a bottom edge, a front surface, a rear surface, first and second side edges, said side edges being spiced apart by a first predetermined width;

at least two pair of slots, said slots extending from the front surface to the rear surface of the back portion and being sized, shaped and disposed to accommodate webbing of a child safety seat seatbelt;

a seat portion, said sat portion being formed of resilient padding material of a second predetermined thickness, and having a top edge, a bottom edge, a front surface, a rear surface, first and second side edges, said side edges being spaced apart by a second predetermined width;

said bottom edge including a notch, said notch being sized, shaped and disposed to accommodate a buckle of a child safety seat seatbelt;

said back portion being hingedly attached at its bottom edge along the entire length of the top edge of the seat portion;

a removable, washable cover, said cover being sized and shaped to fit slidably over the seat pad; and a pair of reversibly separable closure means, said closure means permitting removal of the seat pad from the cover;

said cover including reinforced openings, said openings sized, shaped and disposed to accommodate passage of webbing of a child safety seat seatbelt through the cover and into the slots in the seat pad.

2. A car seat pad as described in claim 1, further comprising:

a raised seat support, said seat support being formed of resilient material of a third predetermined thickness and having a top edge, a bottom edge, a first side edge, a second side edge a front surface and a back surface; and said seat support being attached at its back surface to the front surface of the seat portion adjacent its top edge.

3. A car seat pad as described in claim 2 wherein the seat support is formed of isotonic foam.

4. A car seat pad as described in claim 2 wherein the seat support is formed of encapsulated gel material.

5. A car seat pad as described in claim 1, further comprising:

a raised lumbar support, said lumbar support being formed of resilient material of a fourth predetermined thickness and having a top edge, a bottom edge, a first side edge, a second side edge a front surface and a back surface; and said lumbar support being attached at its back surface to the front surface of the back portion adjacent its bottom edge.

6. A car seat pad as described in claim 5 wherein the lumbar support is formed of isotonic foam.

7. A car seat pad as described in claim 5 wherein the lumbar support is formed of encapsulated gel material.

8. A car seat pad as described in claim 1 wherein:

the first and second side edges of the back portion taper inwardly toward the bottom edge, said bottom edge separating said side edges by a third predetermined width less than said first predetermined width;

the first and second side edges of the seat portion taper inwardly toward the top edge, said top edge separating said side edges by the third predetermined width; and whereby, when the car seat pad is installed into a child safety seat and folded at an intersection of the back portion and the seat portion, excessive padding material will not accumulate in the safety seat and cause discomfort to a user.

9. A car seat pad as described in claim 1 wherein the back portion and the seat portion are formed of isotonic foam.

10. A car seat pad as described in claim 1 wherein the back portion and the seat portion are formed of encapsulated gel material.

* * * * *